2 Sheets—Sheet 1.

T. L. RANKIN.
ICE-MACHINE.

No. 188,945. Patented March 27, 1877.

WITNESSES
Henry N. Miller
Franck L. Ourand

INVENTOR
Thos. L. Rankin
Alexander Mason
ATTORNEYS.

N. PETERS, PHOTO-LITHOGRAPHER, WASHINGTON, D. C.

2 Sheets—Sheet 2.

T. L. RANKIN.
ICE-MACHINE.

No. 188,945. Patented March 27, 1877.

WITNESSES
Henry N. Miller
Franck L. Durand

INVENTOR
Thos. L. Rankin.
Alexander Mason
ATTORNEYS.

N. PETERS, PHOTO-LITHOGRAPHER, WASHINGTON, D C.

UNITED STATES PATENT OFFICE.

THOMAS L. RANKIN, OF LYNDON, KANSAS, ASSIGNOR TO NORTH AMERICAN ICE COMPANY, OF DALLAS, TEXAS.

IMPROVEMENT IN ICE-MACHINES.

Specification forming part of Letters Patent No. 188,945, dated March 27, 1877; application filed January 4, 1877.

*To all whom it may concern:*

Be it known that I, THOMAS L. RANKIN, of Lyndon, in the county of Osage and in the State of Kansas, have invented certain new and useful Improvements in Machine for Manufacturing Ice; and do hereby declare that the following is a full, clear, and exact description thereof, reference being had to the accompanying drawings and to the letters of reference marked thereon, making a part of this specification.

The nature of my invention consists in the construction and arrangement of an ice-machine, as will be hereinafter more fully set forth.

In order to enable others skilled in the art to which my invention appertains to make and use the same, I will now proceed to describe its construction and operation, referring to the annexed drawings, in which—

Figure 1:
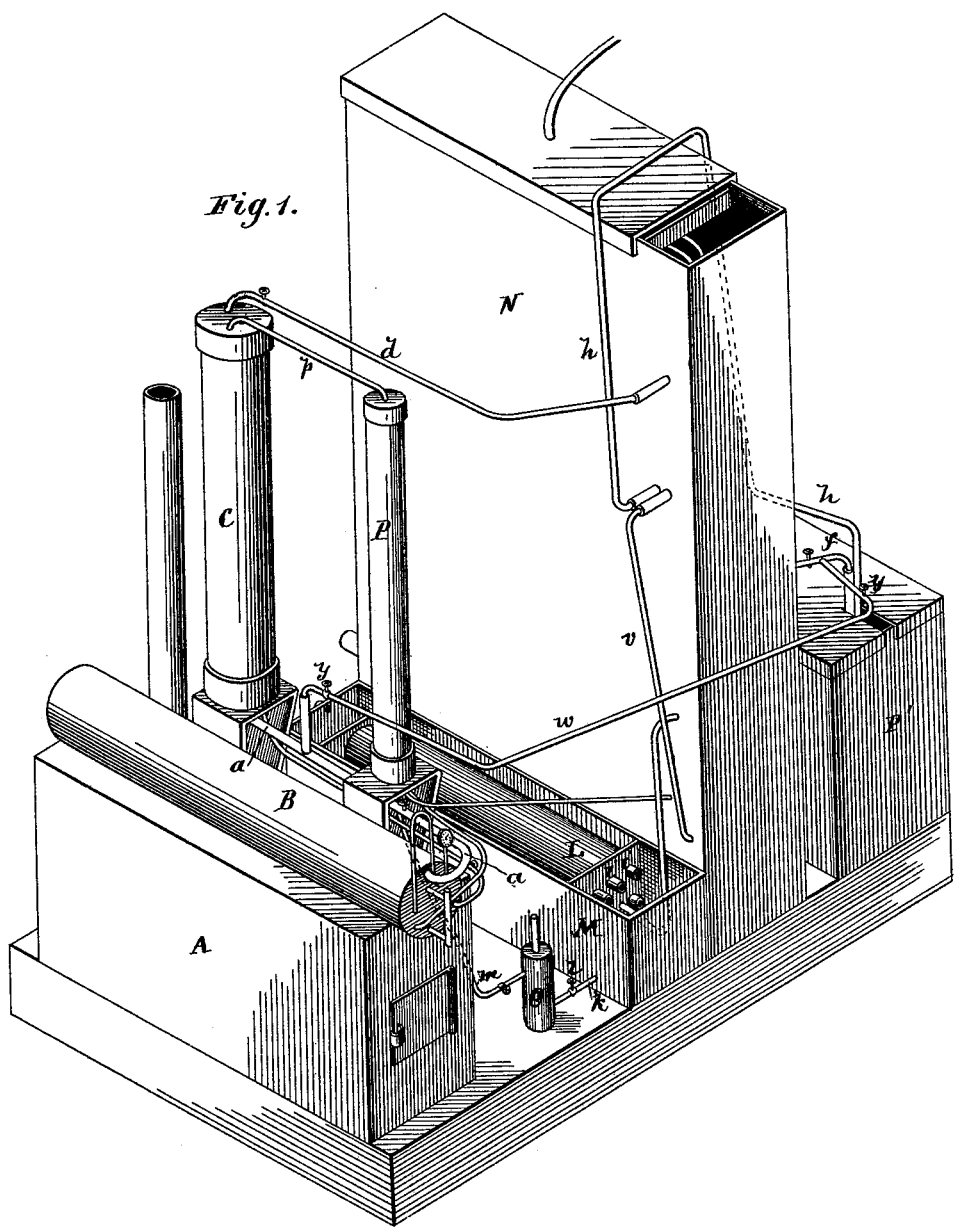
Figure 2:
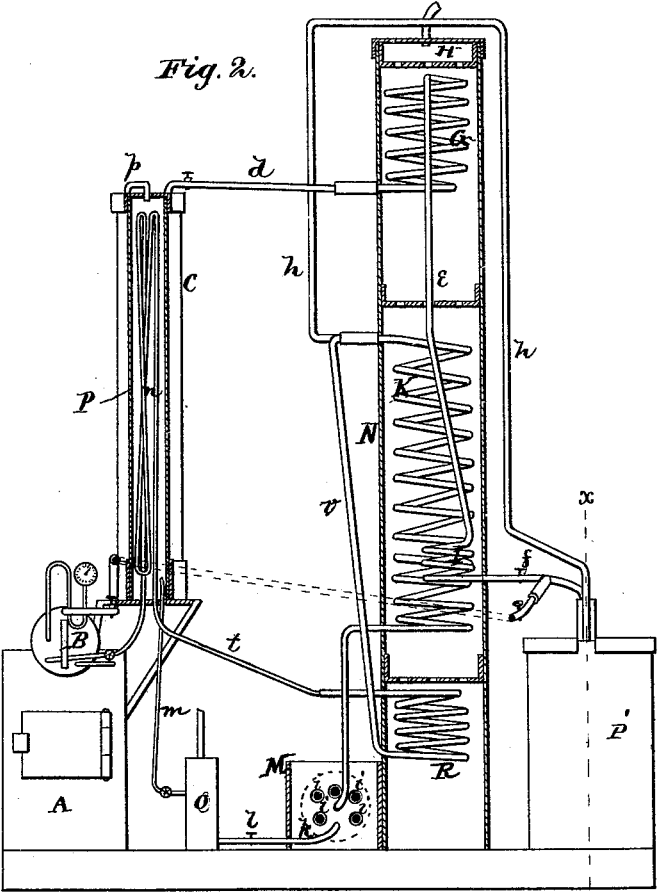
Figure 6:
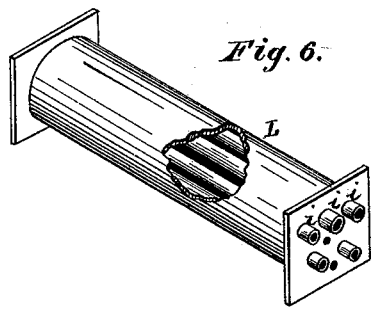
Figure 4:
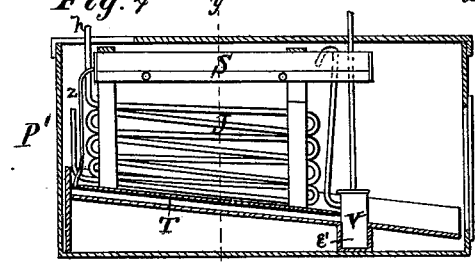
Figure 5:
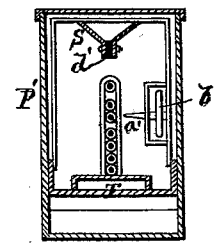

Figure 1 is a perspective view of my entire ice-machine. Fig. 2 is a vertical section of the same. Figs. 3, 4, 5, and 6 are detailed views of certain parts thereof.

A represents the furnace, with boiler or still B. One or more of these boilers may be used, and they should be made of leaf-welded wrought-iron pipe, with cast heads. Ordinarily the size will be ten inches in diameter and sixteen feet long, allowing the ends to extend out beyond the ends of the furnace to protect the rubber used in making gas-joints on the heads from the fire.

From the boiler leads a gas and steam pipe, $a$, to the analyzer or separator C, which is made of ten-inch pipe sixteen feet high. The gas and steam from the still or boiler passes up through the drum of the separator, meeting the strong aqua ammonia as it pours down through it, when such ammonia comes from the equalizer or heater P.

The aqua ammonia is spread within the separator C by means of a series of alternating funnels, D, and cones D' secured upon a vertical center-rod, $b$.

Figure 3:
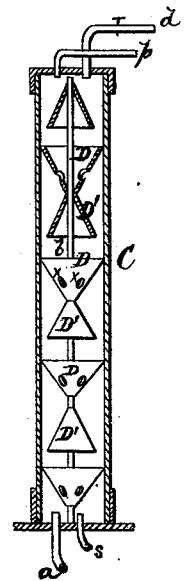

The upper edges of the funnels D touch the interior of the drum C, and the lower portion of each funnel is formed with perforations $x\,x$, as shown in Fig. 3, while the lower ends of the cones D' are smaller in diameter than the drum, so as to leave a space between them.

These funnels and cones spread the liquid, so that the heat can take the best possible action on it and drive the gas off before it reaches the boiler, thus giving a weak liquid in the boiler to return for reabsorption of gas.

From the top of the separator leads a pipe, $d$, to the rectifying or drying coil G, composed of ascending zigzag pipes, over which water is sprinkled from a perforated box or floor, H, above, and through which a strong blast of wind is blown from a blower to assist in carrying away the heat and condensing any steam or water vapor that may have been carried through the analyzer or separator. This condensation flows back through the return water-pipe to the boiler.

The accumulated gas passes from the top of the coil G down through a pipe, $e$, into a coil, I, and liquefies by its own pressure against a valve, $f$, which is used as a distributer of the liquid ammonia. The valve $f$ is opened enough to give pressure in a coil, J, of from ten to thirty pounds, allowing the liquid to evaporate, taking the heat from water flowing over the coil J, thus forming ice in sheets upon the side of the coils to the required thickness, usually about twelve inches.

From the coil J the expanded gas passes up through a pipe, $h$, to the intersection of the coil K, at which intersection it meets the weak water of ammonia from the boiler already cooled.

The gas and water flow together through about one thousand feet, more or less, of pipe, the water being previously cooled, and the coil having cold water sprinkling over it, and air blowing through it to carry off the additional heat given off by the absorption of the gas by the water. By this means I am enabled to obtain strong ammonia by the time it reaches the absorption or store vessel L, and thus always obtaining strong ammonia to pump back to the heater P and flow toward the boiler, and weak ammonia in the boiler to send back to the absorption or store vessel.

This vessel L is made of ten-inch pipe, about sixteen feet long, with a few pipes, $i$, passing through it like a tubular boiler for cold water to flow through as well as around the shell, that the absorption may be completed in it of any gas that has passed in gaseous form to this vessel.

The water flows into the box M containing the absorption-vessel L from a suitable overflow-opening in the condenser-tank N, or the absorption-vessel L may be placed in the bottom of the tank N.

From the vessel L a small water-pipe, $k$, leads to the pump O. This is a small injection-pump intended to pump against pressure enough strong aqua ammonia to keep up a sufficient amount of liquefied ammonia to supply the equalizer P. The flow of this is regulated by a valve or stop-cock, $l$, in the pipe $k$.

$m$ is a pipe leading from the pump to the heater or equalizer P, with a suitable valve in said pipe to shut off the pressure when packing the pump.

The heater or equalizer is a six-inch pipe, sixteen feet high, with a pipe, $n$, from the boiler, passing several times through it, up and down, conducting weak liquid to give off its heat in part to the strong ammonia that is forced up through the shell P by the pump O, and thus heated to a temperature that it begins to part with its gas before it overflows into the analyzer or separator C through the pipe $p$.

Here the strong ammonia flows down to meet the heat from the boiler, and has most of its gas driven out, reaching the boiler through the pipe $s$, which enters the lower part of the boiler.

The pipe $n$ in the heater connects by a pipe, $t$, with the cooling-coil R, which is cooled by the same flow of wind and water as the two coils G and K.

From the weak-liquid-cooling coil R a pipe, $v$, leads to the intersection with the absorbing-coil K, where, as above described, it meets the expanded gas, and they flow together for absorption purposes down through the coil K to the absorption-vessel L. This vessel, in large machines, will be placed in the bottom of the cooling-tank N immediately under all the coils, so that one flow of water and one blast of wind reaches all.

By thus introducing the strong ammonia, as much gas as possible is driven off before it reaches the boiler to get a weak liquid, so that a small amount will do, as it is capable of absorbing so much more than a stronger liquid could.

$w$ is a pipe with two valves, $y y$, starting from a T in the main steam and gas pipe $a$, and connecting with the pipe leading from the coil I to the coil J, so that by shutting off the distributing-valve of the evaporator and opening said valves $y$, a current of hot gas is run through the pipes to melt the ice from the pipes to which it was frozen. To further complete the thawing-off process, a valve is turned open in the pipe $z$, leading from the end of the drip-trough S to a hollow bottom, T, under the ice. This bottom is inclined, and upon the same rests the ice that has been frozen. The water filling this shell or bottom soon thaws the ice loose from the inclined plane upon which it is formed. It is then ready to move down by its own weight on the smooth iron plane.

For convenience I make the ice in cakes, say thirty feet long and about five feet high, one foot thick, using a room about seven feet high and thirty-six feet long, leaving a clear space at the ends of the pipes of six feet for cutting up the ice.

$a'$ represents a pointed dog, worked by means of a wheel, $b'$, for taking hold of and regulating the ice in sliding off the inclined floor, and stop it when six feet has passed, holding the remainder of the large cake until the end has been sawed and split down. Thus, by freezing on an inclined plane, one man can handle cakes weighing many tons, cut it up, and pass it out to the wagon with as much dispatch as from an ordinary ice-house.

The drip-trough S is immediately over the pipes J, upon which the ice is to be frozen in horizontal sheets. In the seam in the bottom of this trough is placed a strip, $d'$, of heavy felt cloth, fastened by suitable bolts and keys to give just the required tension, enough to allow a sufficient quantity of water to percolate through to keep the forming sheet of ice always wet, and, if kept wet, it is formed clear as an icicle.

V is a small pump, that takes the water to be frozen from a gutter, $e'$, at the end of the sheets of ice. Into this gutter flows all the water that runs over the ice and drops on the floor, and into this gutter is also turned a supply-pipe that brings an amount of water equal to what is being frozen, so as to keep up the supply to be pumped to the drip-trough and no more, so that it is always cold water that is dripping down over the ice.

Having thus fully described my invention, what I claim as new, and desire to secure by Letters Patent, is—

1. In a machine for making ice, the combination of a horizontal coil, with an inclined floor, for forming vertical cakes of ice, substantially as set forth.

2. In an evaporator for ice-machines, the trough $e'$, pump V, and drip-trough S, combined and arranged substantially as and for the purposes herein set forth.

3. The combination, in the evaporator P', of the inclined hollow floor T, horizontal coil J, drip-trough S, with felt-strip $d'$, connecting-pipe $z$, and pump V, all constructed substantially as and for the purposes herein set forth.

4. In an evaporator for ice-machines, having an inclined floor, upon which the cakes of ice are formed, a pointed dog, operated by a wheel, $b$, for regulating the sliding down of the ice and holding the cake at any point, as set forth.

5. The combination, with the condenser-tank N, of the rectifying-coil G, absorption-coil K, liquid-ammonia coil I, and cooling-coil R, in the manner shown and described, so that one flow of water and one blast of air will operate upon all, substantially as set forth.

6. The separator C, provided with a series of alternating perforated funnels, D, and cones D' of unequal diameter, arranged upon a central vertical rod, $b$, substantially as and for the purposes herein set forth.

7. The combination, in an ice-machine, of the tank N, the box M, the absorption-vessel L, having a series of longitudinal pipes, $i$, the pipe $k$, and pump O, all substantially as set forth.

8. The heater P, provided with the interior pipes $n$, in combination with the analyzer or separator C, as and for the purposes herein set forth.

9. The combination of the cooling-coil R, w h pipe V, the coil J, with pipe $h$, and the absorption-coil K, into which both pipes $v$ and $h$ lead, whereby the weak ammonia and expended gas are intermingled, substantially as and for the purposes set forth.

10. In combination with the heater, separator, and boiler, the cooling-coil R, arranged to receive the weak ammonia from the heater and thoroughly cool the same before it passes to the absorption coil or chamber, as herein set forth.

11. The pipe $w$, with valves $y\ y$, connecting the main pipe $a$ with the distributer, for the purposes herein set forth.

In testimony that I claim the foregoing I have hereunto set my hand this 2d day of January, 1877.

THOS. L. RANKIN.

Witnesses:
FRANK GALT,
JAS. M. MASON.